W. HOHNER AND L. R. MANVILLE.
APPARATUS FOR REPAIRING WORN PIN BEARINGS OF PIN CONNECTED TRUSSES.
APPLICATION FILED JULY 31, 1917.
1,306,901.
Patented June 17, 1919.
3 SHEETS—SHEET 2.
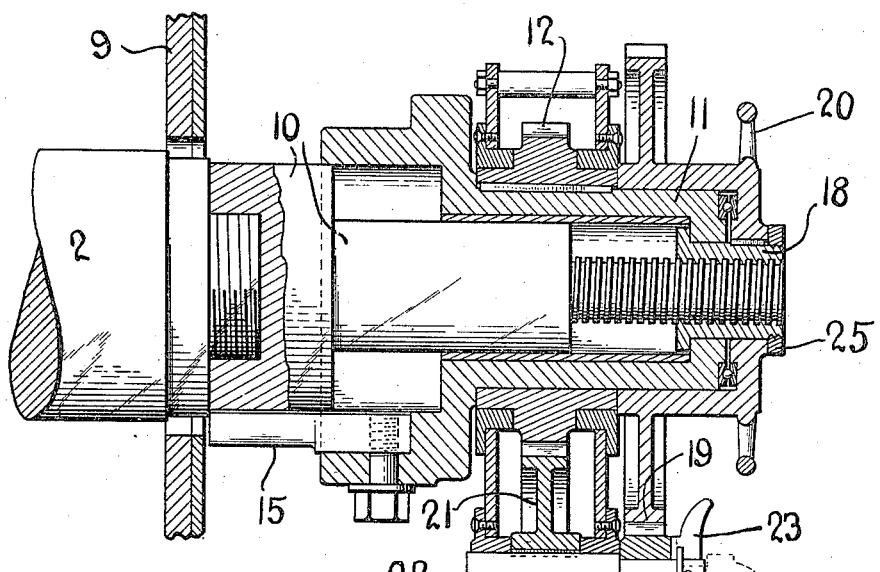
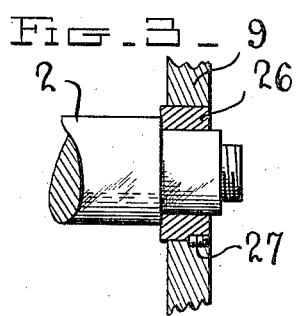
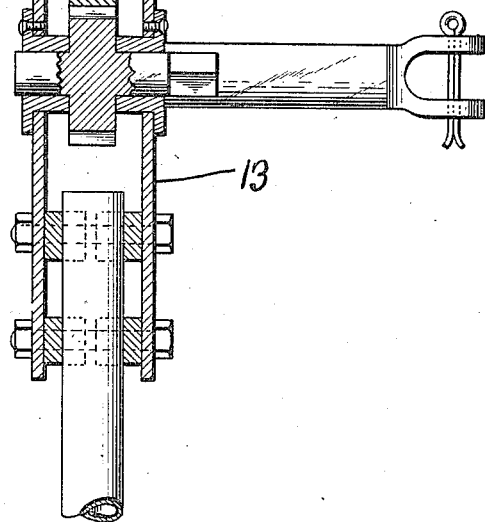
INVENTORS
Loren R. Manville &
William Hohner
BY *Victor J. Evans*
ATTORNEY
WITNESSES W. HOHNER AND L. R. MANVILLE.
APPARATUS FOR REPAIRING WORN PIN BEARINGS OF PIN CONNECTED TRUSSES.
APPLICATION FILED JULY 31, 1917.
1,306,901.
Patented June 17, 1919.
3 SHEETS—SHEET 3.
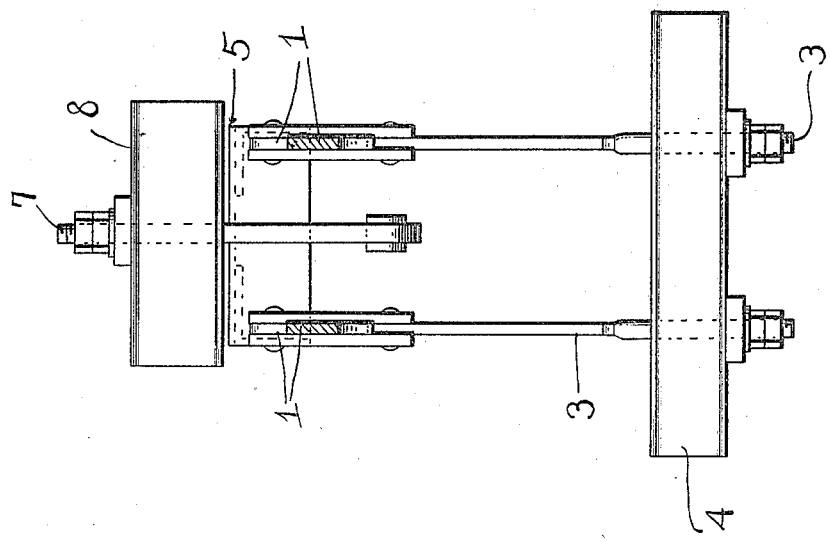
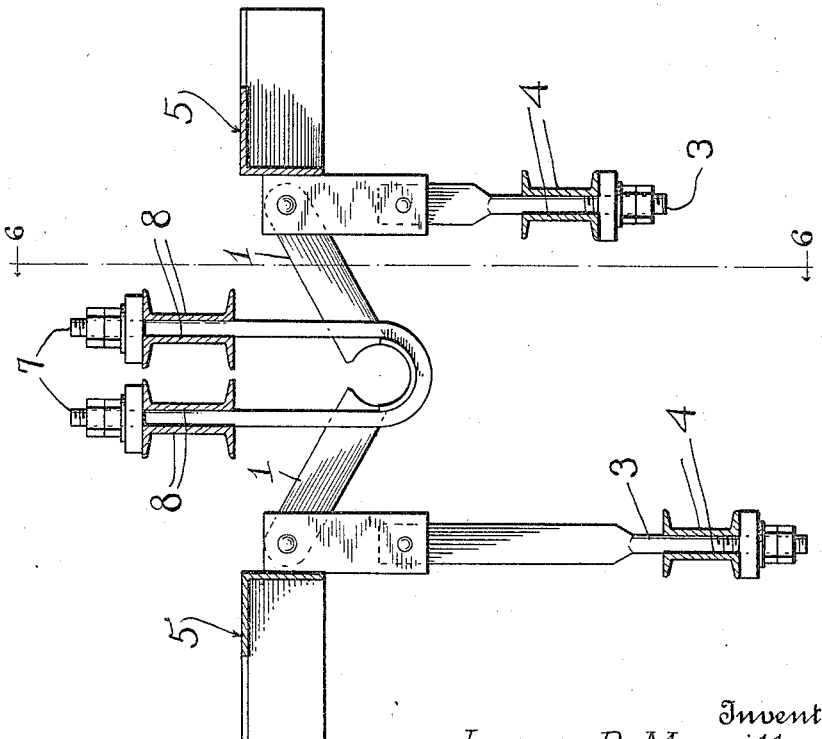
Witnesses
L. B. James
P. M. Smith
Inventors
Loren R. Manville &
William Hohner
By Victor J. Evans
Attorney

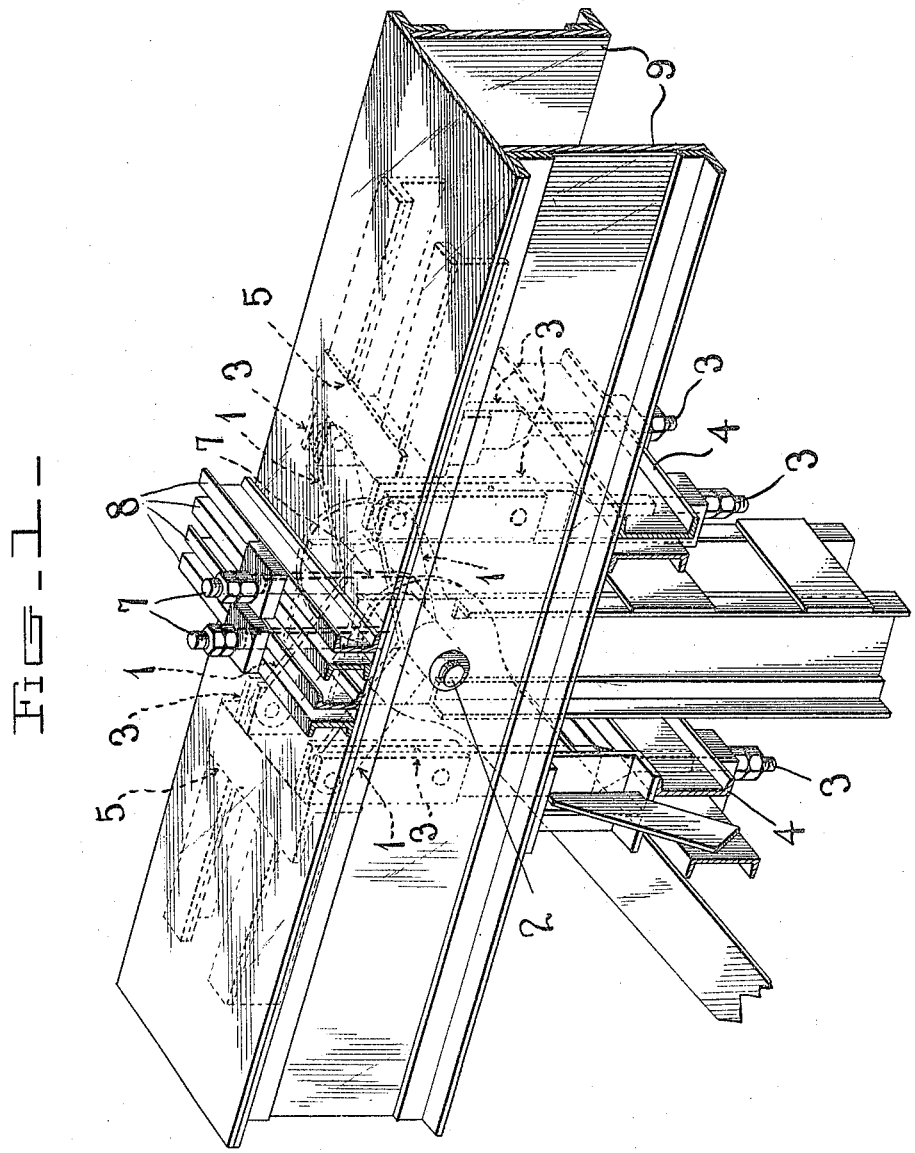

UNITED STATES PATENT OFFICE.

WILLIAM HOHNER, OF WOODHAVEN, AND LOREN R. MANVILLE, OF YONKERS, NEW YORK.

APPARATUS FOR REPAIRING WORN PIN-BEARINGS OF PIN-CONNECTED TRUSSES.

1,306,901.            Specification of Letters Patent.      Patented June 17, 1919.

Application filed July 31, 1917. Serial No. 183,777.

*To all whom it may concern:*

Be it known that we, WILLIAM HOHNER and LOREN R. MANVILLE, citizens of United States of America, residing at Woodhaven and Yonkers, respectively, in the counties of Queens and Westchester, respectively, and State of New York, respectively, have invented new and useful Improvements in Apparatus for Repairing Worn Pin-Bearings of Pin-Connected Trusses, of which the following is a specification.

This invention relates to apparatus for repairing worn pin bearings of pin connected trusses.

The object of our invention is to provide a means of supporting connecting pins of trusses and boring out the worn pin holes as well as turning down the worn pins at their points of support concentrically with the pin center in order that steel bushings may be inserted to a tight fit and thus eliminate further wear at the point repaired. This work can be accomplished with the improved apparatus without interruption to traffic and without the use of falsework under the truss, which is expensive and, in the case of swing-bridges, impracticable if railroad and river traffic are to be maintained.

A further purpose of the apparatus is to provide a means of boring out the pin holes of all the members attaching to a given pin in order that the old pin may then be removed and a new pin of a larger diameter inserted. The apparatus permits of this class of work being accomplished much quicker and cheaper than by the usual procedures, and with a minimum of interruption to traffic inasmuch as it permits of boring from both ends of the pin simultaneously; besides it eliminates the use of the boring bar which requires time and accuracy in setting, and it furthermore permits of a complete set-up of all the details necessary preparatory to the actual boring operation itself without interruption to traffic. It also insures an easy removal of the old pin which usually becomes necked down in places, or rusted to some of the connecting truss members.

In the accompanying drawings:—

Figure 1 is a perspective drawing of that part of the apparatus which supports the pin rigidly while the boring is being done.

Fig. 2 is a sectional view of that part of the apparatus which performs the boring operation and which is attached to the threaded extension of the truss pin.

Fig. 3 is a fragmentary section showing the finished cut in a web of a truss chord and also the resulting cut on the pin, with a section of the steel bushing inserted in place.

Fig. 4 is a fragmentary section showing the finished cut in the case where it is desired to remove the old pin and replace it with a new pin of a larger diameter, and it also shows the arrangement of that part of the apparatus which supports the pin.

Fig. 5 is a vertical longitudinal section showing the attaching means.

Fig. 6 is a vertical transverse section illustrating the same attaching means.

In detail the apparatus consists of (referring to Fig. 1) four inclined bars 1 which are arranged symmetrically about the center of the truss pin 2. The bars 1 are concaved at one end to fit accurately the circumference of the pin and are supported at their other ends by adjustable hanger bars 3 which are bolted to beams 4 which in turn are fixed to the truss members 9. Hanger bars 3 slide in grooves in supports 5 which are also fixed to the truss members 9. The apparatus further consists of a yoke 7 rounded to fit the truss pin 2 at its center and bolted at both ends to beams 8 which are fixed to the truss members 9. If necessary, in the event of a truss member attaching to the pin at its center, two of the yokes may be used by arranging them symmetrically about the center of the truss pin.

Wear at the pin supports of trusses usually occurs where the pins are supported by the webs of chords (such as chord 9). The part of our apparatus just described provides a means of lifting the pin away from its bearing on the chord webs and holding it rigidly in any desired position within the limits of the worn pin hole in the chord web. With the pin so held, the boring part of the apparatus which attaches to the pin may then be operated and the worn pin hole in the chord web bored out and the worn pin turned down, both cuts being concentric with the pin center.

The loads which the pin 2 imparts to the chord 9, after the supporting system has been tightened and the pin moved away from its bearing on the web, are imparted to the chord through the hanger supports 4 and 5 with very little if any eccentricity of loading on the chord 9.

The adjustment of the pin within the limits of the worn pin hole in the chord web may be accomplished as follows:

By tightening nuts on hanger bars 3 and loosening nuts on yoke 7, the truss pin 2 will be forced downwardly, and by reversing the operation it may be forced upwardly relatively to the chord member 9. By tightening the nuts of the left hanger bars 3 and loosening the nuts on the right hanger bars 3, loosening nuts on the left leg of the yoke 7 and tightening the nuts on its right leg, the pin 2 will be forced to the right, and vice versa.

With the pin 2 in its desired position, the supporting system is then to be tightened until movement of the pin in the pin hole, during the passage of traffic, is reduced to a minimum, when the boring part of the apparatus can be attached to the threaded extension of the pin and the boring proceeded with.

In Fig. 2, 10 represents a head which screws on to the threaded extension of the pin 2. The head 10 carries a frame 11 which is rotated about the head 10 by means of gears 12 and 21 which in turn are geared in frame 13 to a motor (not shown). The rotating frame 11 carries cutting tools 15. Gear 16 is attached to the shaft 22 of gear 21 by a coupler 23 and turns if connected with 22. Gear 19 is keyed to the threaded bushing 18 and rotates around the head 10. As the bushing 18 rotates, it advances toward the chord web carrying the tool head 10 along with it. Inside the hub of 19 and between this hub and the end of 11, a ball bearing is inserted. 11 is held on the bushing 18 longitudinally by a collar 25. By means of the proportioning of the gears, the longitudinal movement is made so that a practicable advance of the tools is obtained. In case it is necessary to withdraw the tool head quickly from the chord web, the coupler 23 is opened, thereby disconnecting the gear 16 from the shaft 22, when the turning movement of bushing 18 can be reversed by means of the hand wheel 20 which forms a part of the hub 19; in that case the gear 16 rotates idly around the shaft 22. One or more cutting tools are set in pockets in rotating frame 11. Each tool has the same inside and outside diameter about the rotating center of frame 11, and each tool cuts the same width. The tools make the bore on the web and the cut on the pin simultaneously.

Fig. 2 shows the wear of the pin and bearing and the position of tool before cutting.

Fig. 3 shows the bushing in place after the bore has been made. The bushing 26 is turned down to an exact fit and forced in by a screw-jack or by means of tapping. Tap screws 27 may be inserted to fix the bushing to the chord web and prevent removal.

Fig. 4 shows the pin supports as described in connection with Fig. 1, in place, and a cut made through all truss members connecting to the pin. This procedure is to be followed in case it is desired to remove the old pin and insert a new pin with a larger diameter. The truss would have to be stayed in this case, and the truss members would have to be firmly clamped to each other at the point to be repaired. After the cut as shown in Fig. 4 has been made, the old pin may readily be removed and the new pin inserted to fit the diameter of the bore.

The part of the apparatus for holding the pin and the part of the apparatus for boring the web of the chord or other truss members surrounding the pin are dependent absolutely upon each other. The accuracy of the boring part of the apparatus is dependent upon the efficiency and reliability of that portion of the apparatus which holds the pin during the boring operation. Without such accuracy the bushings could not be made to fit properly.

We claim:—

1. In apparatus for the repair of the pin bearings of pin connected trusses, supports adapted to be fastened to the truss members, hanger bars adjustable in relation to said supports, and a plurality of inclined pin holding bars adapted to be arranged in pairs equi-distantly from the center or at the center of said pin, each of said pin holding bars being formed at one end to fit against said pin and being held at the opposite end by the adjustable hanger bars.

2. In apparatus for the repair of the pin bearings of pin connected trusses, supports adapted to be fastened to the truss members, hanger bars adjustable in relation to said supports, a plurality of inclined pin holding bars adapted to be arranged in pairs equi-distantly from the center of said pin, each of said pin holding bars being formed at one end to fit against said pin and being held at the opposite end by the adjustable hanger bars, a U-shaped steel yoke adapted to embrace said pin, and fixed supporting means for said yoke, the yoke having an adjustable connection with said fixed supporting means.

3. In apparatus for the repair of the pin bearings of pin connected trusses, supports adapted to be fastened to the truss members, hanger bars adjustable in relation to said supports, a plurality of inclined pin holding bars adapted to be arranged in pairs equi-distantly from the center or at the center of said pin, each of said pin holding bars being formed at one end to fit against said pin and being held at the opposite end by the adjustable hanger bars, yoke supporting means, and a plurality of U-shaped yokes adapted to embrace said pin at points in spaced relation to each other and having an adjustable connection with said supporting means.

4. In apparatus for the repair of pin connected trusses, the combination of a supporting head having a threaded bore to receive a truss pin supported by a yoke or a plurality of yokes, a rotatable head journaled thereon, boring and turning means carried by said rotatable head, and means for advancing said rotatable head in the direction of length of the truss pin, said boring and turning means acting simultaneously on the pin and the truss members to form an annular space, the outer and inner walls defining which are concentric to provide for the insertion of a bushing.

In testimony whereof we affix our signatures.

WILLIAM HOHNER.
LOREN R. MANVILLE.

Copies of this patent may be obtained for five cents each, by addressing the "Commissioner of Patents, Washington, D. C."